United States Patent Office 3,421,319
Patented Jan. 14, 1969

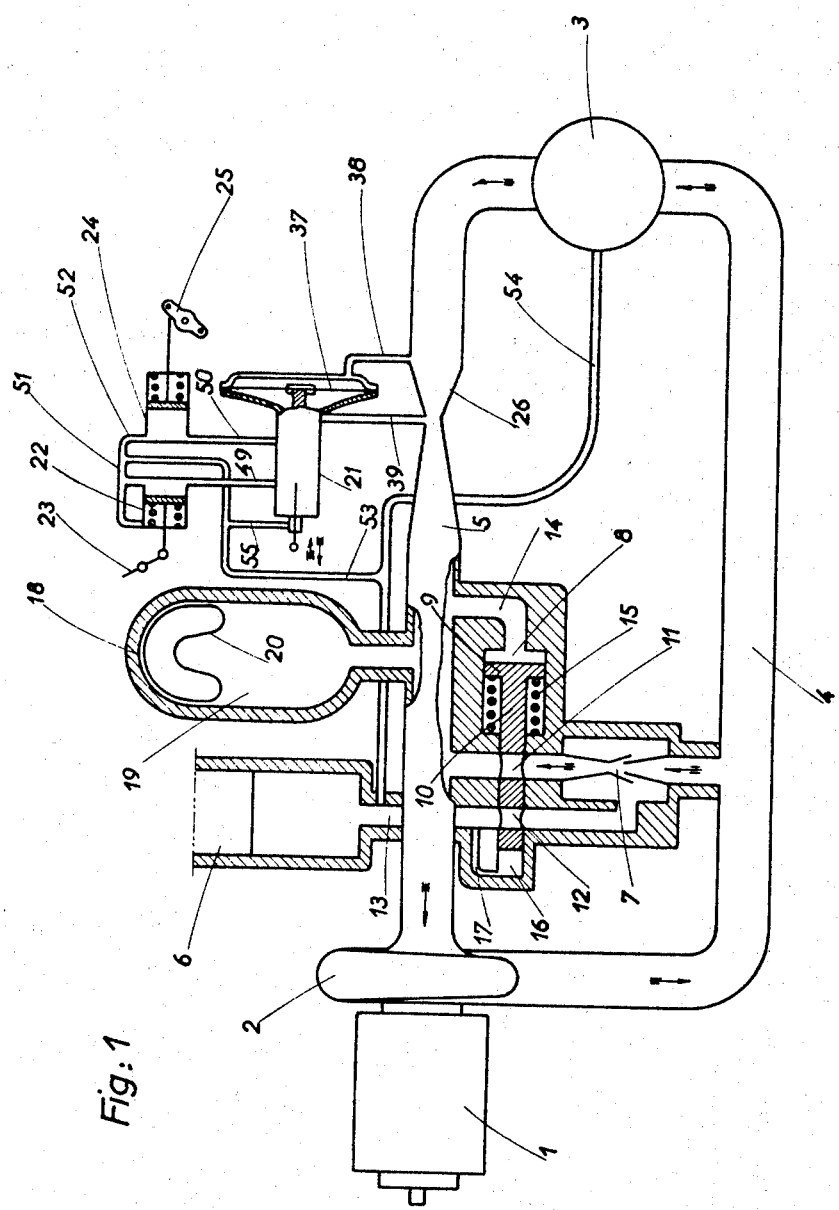

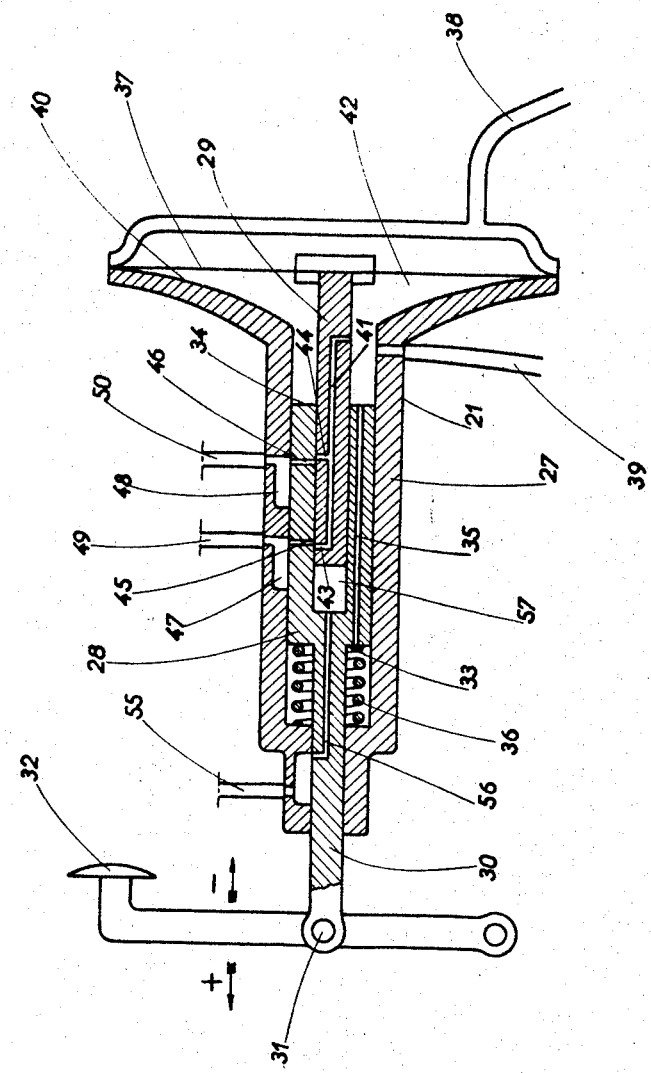

3,421,319
HYDRAULIC TRANSMISSION WITH DIRECT SPEED-CONTROL
Pierre Charles Patin, 58 Rue de Sevres,
Boulogne-sur-Seine, France
Filed July 19, 1967, Ser. No. 654,623
Claims priority, application France, Aug. 30, 1966, 74,600
U.S. Cl. 60—53      3 Claims
Int. Cl. F16d *31/00;* F16d *33/00;* F04b *23/04*

ABSTRACT OF THE DISCLOSURE

A hydraulic transmission with direct speed-control, capable of use in particular for a motor vehicle, wherein the liquid-transmitter is a turbo-pump, and the receiver is a volumetric motor. This transmission comprises a diaphragm-type servomotor regulator. The motor delivery conduit comprises a venturi, and pipes link, on the one hand, upstream of the venturi and the enclosure situated on one side of the diaphragm, and on the other hand the venturi and the enclosure situated on the other side of the diaphragm. The diaphragm is linked to a distributor piston moving in a jacket actuated by a speed-control pedal. The jacket slides in a sleeve having two orifices, one communicating with acceleration-control means, and the other with brake-control means.

---

The invention relates to a hydraulic transmission with direct speed-control.

This hydraulic transmission is of the type described in French Patent No. 1,325,707 filed on Mar. 14, 1962, by Pierre Patin, and entitled, "Hydraulic Transmission."

Such a transmission comprises a liquid-transmitter in the form of a turbo-pump and a liquid-receiver in the form of at least one volumetric motor.

Such a transmission exhibits the advantage of being self-regulating, and of enabling the torque transmitted by the receiver to be constantly adapted to the power supplied by the transmitter, that is to say ultimately to the power supplied by the engine which drives this transmitter.

In some cases, and more particularly on certain vehicles, for example that described in French Patent No. 1,183,913 filed on Oct. 4, 1957, by Pierre Patin, entitled "Balancer for Vehicles, More Particularly for Motor Vehicles," it is advantageous to use a system of transmission which enables the speed to be adjusted directly to the desired value. The invention enables this adjustment to be obtained.

According to the invention, the hydraulic transmission comprises a diaphragm-type servomotor regulator the delivery conduit between the receiver and the transmitter comprises a venturi, and pipes are provided between upstream of the venturi and one side of the diaphragm, and between the neck of the venturi and the other side of the diaphragm, this latter being linked to a distributor piston having at least one passage in communication with the venturi, this piston moving in a jacket actuated by the speed-control pedal, this jacket sliding in a fixed sleeve having two orifices, one communicating with the acceleration control and the other with the brake control, and the jacket being equipped with conduits capable respectively of coming into position opposite to the passage from the distributor piston and of setting up communication with one of the two orifices corresponding to acceleration and braking.

The invention will now be described in greater detail with reference to the appended drawings.

FIGURE 1 is a general diagrammatic view illustrating the whole of a hydraulic transmission according to the invention; and FIGURE 2 illustrates the speed-regulator.

The transmission is driven by an engine 1. This engine may be of any type, for example a heat-engine (Diesel engine or internal-combustion engine). If a heat-engine is used, choice will preferably fall on a high-speed engine or a gas-turbine which enables small centrifugal pumps to be used.

The engine 1 drives a centrifugal pump 2 which feeds a volumetric motor 3. This motor 3 may be of a known type, for example of the type described in French Patent No. 1,099,560 filed Feb. 15, 1954, by Pierre Patin, entitled, "Improvements in Machines Having Coupled Gears and Their Uses."

The fluid is delivered by the turbo-pump 2 to a conduit 4, and returns to the turbo-pump via a conduit 5.

However, high-speed turbo-pumps always involve the risk of cavitation and the aspiration pressure $Pa$ in the conduit 5 must not drop below a minimum value $Pm$.

In order to achieve this object, the transmission comprises a fluid-reservoir 6 at atmospheric pressure, and an ejector 7 disposed in by-pass fashion between the delivery conduit 4 and the aspiration conduit 5. Operation of the ejector 7 is controlled by a servomotor 8 comprising a piston 9 fast with a rod 10 drilled with orifices 11 and 12. The orifice 11 enables the conduits 4 and 5 to be placed in communication by way of the ejector 7. The orifice 12 enables the ejector 7 to be fed with fluid from the reservoir 6.

The servomotor 8 communicates with the conduit 5 via a conduit 14.

A spring 15 tends to move the piston 9 in the direction of opening the orifices 11 and 12 in order to set up communication between the conduits 4 and 5, and in order to feed the ejector 7 with fluid from the reservoir 6.

If the pressure in the conduit 5 is greater than a pressure $Pm$, below which it must not drop for fear of setting up cavitation in the turbo-pump 2, this pressure greater than $Pm$ causes the piston 9 to move to the left, and puts the orifices 11 and 12 out of action. The end of the rod 10 then enters a small chamber 16. This small chamber is in communication with the conduit 13 via a conduit 17, so that there is neither over-pressure nor depression in the small chamber 16.

The transmission furthermore comprises a hydro-pneumatic accumulator 18 whereof the chamber 19 is in communication with the conduit 5. This accumulator may be of known type, and contains an enclosed diaphragm 20 filled with a gas such as air.

The part of the hydraulic transmission which has just been described enables there to be sufficient pressure in the conduit 5 to prevent the occurrence of cavitation on the part of the turbo-pump 2.

Speed-regulation is carried out by a servomotor regulator 21 which feeds pressure either to a servomotor 22 controlling the gas-inlet butterfly by way of a system of rods 23, or to a servomotor 24 controlling the cam o1 a brake-drum by way of a system of rods 25. The servomotor 24 may moreover simply take the form of the master-cylinder of the hydraulic braking system of a vehicle.

The regulator 21 adapts the true speed of the transmission to the controlled speed. For this purpose, it receives indications concerning the true speed, this latter being proportional to the amount of fluid emerging from the volumetric motor 3. The indications are supplied by way of a venturi 26.

The servomotor regulator 21 is depicted in greater detail in FIGURE 2.

This servomotor regulator comprises a body 27 in the form of a cylinder in which there move two concentric pistons 28 and 29.

The piston 28 is driven by a rod 30 articulated at 31 to the speed-control pedal 32. The inner piston 29 is equal in diameter to the rod 30, so that the pressures acting on the faces 33 and 34 of the piston 28 are balanced. A conduit 35 moreover links the chambers disposed on each side of the piston 28. This imparts balance to the pressures, and the piston 28, which as stated is controlled by the pedal 32, is subjected only to the compression of a spring 36.

The conduit 35 may be calibrated so as to limit the speed at which the piston 28 moves.

Movement of the piston 29 is controlled by a diaphragm 37, which is exposed on the one hand to a pressure $Pam$ prevailing upstream of the venturi 26, and on the other hand to the pressure $Pav$ prevailing in the constriction of the venturi.

In order to obtain these pressures on each side of the diaphragm 37, a conduit 38 is connected to the conduit 5 before the venturi 26, and opens out on the right of the diaphragm 37, and a conduit 39 is connected directly to the constriction of the venturi, and opens out on the other side of the diaphragm 37.

It is known that the pressure-difference $Pam-Pav$ is proportional not to the amount of fluid delivered, that is to say to the speed, but to the square of this amount, that is to say to the square of the speed. In the hydraulic transmission according to the invention, it is desirable for the movement of the piston 29 to be proportional to the speed, so as to enable adjustment to be easily carried out by the servomotor regulator.

The servomotor 21 is therefore so designed that when the diaphragm 37 flexes under the action of the pressure-difference there is a progressive reduction in the surface-area of this diaphragm on which this pressure-difference acts. In order to achieve this object, the body of the regulator 21 has at one end a flared shape 40, against which the diaphragm 37 comes progressively to bear as it is being deformed. The flared shape 40 is so calculated that the movement of the piston 29 is proportional to the speed, the diaphragm 37 withstanding the pressure-difference by reason of its own elasticity.

It is easy to determine the cross-section of the flared shape 40 in order to obtain this result.

By way of example, it may be indicated that the curve of the cross-section of the wall 40 of the servomotor regulator 21 passing through a plane through its axis complies substantially with the formula $$y = \frac{A}{a^4} \frac{(x^2-1)^2}{a^2}$$

wherein $x$ is reckoned along the radius, $y$ is reckoned along the axis of the servomotor, $a$ is the diameter of the diaphragm in its mean position when at rest, and $A$ is a fixed quantity such that $$A = \frac{16K^2Ee^3}{3(1-\nu 2)}$$

K is the coefficient of proportionality between movement of the piston and speed, E is the modulus of elasticity of the diaphragm, $e$ is the thickness of the diaphragm, and $\nu$ is Poisson's coefficient.

The piston 29 contains a conduit 41 fed with fluid from the chamber 42 of the servomotor regulator, this chamber being itself in communication with the constriction of the venturi via the conduit 39. The pressure $Pav$ therefore prevails in the chamber 42. The conduit 41 opens out via orifices 43 and 44 to the interior of the piston 28. This latter is drilled with orifices 45 and 46, which are staggered with respect to the orifices 43 and 44. The orifices 45 and 46 themselves open out into chambers 47 and 48 in the wall of the servomotor 21. Conduits 49 and 50 feed the speed-control servomotor 22 and the braking-control servomotor 24 respectively.

The piston 29 can move in one direction or in the opposite direction under the action of the diaphragm 37. Any movement on the part of the piston 29 causes one of the chambers 47 and 48 to be fed, with consequent operation of one of the two servomotor 22 and 24. Any relative movement between the piston 29 and the piston 28 therefore causes either acceleration or braking. Each of the servomotors 22 and 24 is of the "leakage" type, and comprises a calibrated leakage 51 or 52, so that in the absence of any feed the corresponding servomotor returns to the position of rest. Such servomotors are moreover well-known, and do not need any detailed description.

A group of pipes 53, 54 and 55 takes the leakages from the servomotors and the volumetric motor 3 back to the reservoir 6 at atmospheric pressure. The pipe 55, in conjunction with a conduit 56 in the control rod of the piston 28, places the space 57 between the pistons 28 and 29 at atmospheric pressure.

The transmission which has just been described is particularly simple in operation. The engine-transmission unit being in a given situation, if the user pushes the pedal 32 in the direction of an increase in speed, the piston 28 moves to the left (FIGURE 2), placing the orifices 43 and 45 in communication, and therefore allowing feed to take place to the chamber 47, which opens out into the conduit 49 and controls the operation of the speed-increase servomotor 22.

The resultant increase in speed then causes an increase to take place in the difference $Pam-Pav$, and the diaphragm 37 moves to the left, driving the piston 29 until correct balance is set up between the feed to the servomotor 22 and the calibrated leakage 51.

An analogous process takes place for braking if the pedal 32 is released. In this case, the braking servomotor 24 is fed by way of the conduits 44 and 46, the chamber 48, and the conduit 50.

The invention is naturally not limited by the details of the form of embodiment which has just been described, which details could be modified without departing from the scope of the invention.

I claim:

1. Hydraulic transmission with direct speed-control, wherein the liquid-transmitter is a turbo-pump, and the receiver takes the form of at least one volumetric motor, characterized in that the hydraulic transmission comprises a diaphragm-type servomotor regulator, the delivery conduit between the receiver and the transmitter comprises a venturi, and pipes are provided between upstream of the venturi and one side of the diaphragm, and between the venturi and the other side of the diaphragm, this latter being linked to a distributor piston having at least one passage in communication with the venturi, this piston moving in a jacket actuated by the speed-control pedal, this jacket sliding in a fixed sleeve having two orifices, one communicating with the acceleration control and the other with the brake control, and the jacket being provided with two conduits capable respectively of coming into position opposite to the passage from the distributor piston and of setting up communication with one of the two orifices corresponding to acceleration and braking.

2. Hydraulic transmission according to claim 1, characterized in that the servomotor regulator comprises an elastic diaphragm bounded at its periphery by a circumference, and a wall against which the diaphragm can come to bear as it is being deformed in the direction of an increase in speed, comprising a flared shape such that movement of the distributor piston proportional to speed corresponds to a pressure-difference.

3. Hydraulic transmission according to claim 1, characterized in that the curve of the cross-section of the wall of the servomotor regulator through a plane passing through its axis complies substantially with the formula $$y = \frac{A}{a^4} \frac{(x^2-1)^2}{a^2}$$

wherein $x$ is reckoned along the radius, $y$ is reckoned along the axis of the servomotor, $a$ is the diameter of the diaphragm in its mean position when at rest, and A is a fixed quantity such that $$A = \frac{16 K^2 E e^3}{3(1-\nu 2)}$$

K being the coefficient of proportionality between movement of the piston and speed, E being the modulus of elasticity of the diaphragm, $e$ being the thickness of the diaphragm, and $\nu$ being Poisson's coefficient.

References Cited

UNITED STATES PATENTS 2,251,664 8/1941 Davis _____ 60—52
3,370,423 2/1968 Vaughan _____ 60—53 XR EDGAR W. GEOGHEGAN, Primary Examiner.

U.S. Cl. X.R.

60—52; 103—5